United States Patent
Tachibanada et al.

(10) Patent No.: US 10,703,349 B2
(45) Date of Patent: Jul. 7, 2020

(54) FLUID PRESSURE CONTROL DEVICE

(71) Applicant: Honda Motor Co., Ltd., Tokyo (JP)

(72) Inventors: Yuya Tachibanada, Saitama (JP); Yutaka Ishikawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 202 days.

(21) Appl. No.: 15/927,091

(22) Filed: Mar. 21, 2018

(65) Prior Publication Data
US 2018/0281765 A1 Oct. 4, 2018

(30) Foreign Application Priority Data
Mar. 30, 2017 (JP) .................................. 2017-068953

(51) Int. Cl.
*F16D 48/02* (2006.01)
*B60T 11/10* (2006.01)
(Continued)

(52) U.S. Cl.
CPC .............. *B60T 11/106* (2013.01); *B60T 1/005* (2013.01); *B60T 1/062* (2013.01); *F16D 48/02* (2013.01);
(Continued)

(58) Field of Classification Search
CPC ...... B60W 10/188; F16D 48/02; F16D 67/04; F16D 63/006; F16H 61/0021; F16H 61/0206; F16H 63/3483; F16H 61/143
See application file for complete search history.

(56) References Cited

U.S. PATENT DOCUMENTS

| 10,167,953 B2 * | 1/2019 | Mukai ..................... F16H 61/30 |
| 2014/0256497 A1 * | 9/2014 | Ishikawa ................. F16H 61/16 475/269 |

(Continued)

FOREIGN PATENT DOCUMENTS

| CN | 102037259 | 4/2011 |
| CN | 103322139 | 9/2013 |

(Continued)

OTHER PUBLICATIONS

"Office Action of Japan Counterpart Application," dated Oct. 16, 2018,with English translation thereof, p. 1-p. 7.
(Continued)

*Primary Examiner* — Stacey A Fluhart
(74) *Attorney, Agent, or Firm* — JCIPRNET

(57) ABSTRACT

One solenoid valve included in a hydraulic pressure control device has at least two functions among the following (1) to (6) functions, (1) switching a state of a two-way clutch, (2) switching a state of a parking lock mechanism, (3) switching the supply of hydraulic pressure to a first brake that is put into an engaged state when a gear stage selected when driving of a vehicle starts is set, (4) controlling a line pressure adjustment valve so that a decrease in a line pressure is prevented when the temperature of a hydraulic fluid is a first predetermined temperature or higher, (5) preventing the occurrence of a creep phenomenon in a neutral range when the temperature of the hydraulic fluid is a second predetermined temperature or lower, and (6) boosting a line pressure by performing switching to another linear solenoid valve when the line pressure adjustment valve has failed.

3 Claims, 9 Drawing Sheets

(51) Int. Cl.
*F16H 61/14* (2006.01)
*F16H 61/00* (2006.01)
*F16H 63/34* (2006.01)
*B60T 1/00* (2006.01)
*F16D 67/04* (2006.01)
*F16D 63/00* (2006.01)
*B60T 1/06* (2006.01)
*F16H 61/02* (2006.01)
*F16H 15/56* (2006.01)
*F16H 3/66* (2006.01)

(52) U.S. Cl.
CPC ........... *F16D 63/006* (2013.01); *F16D 67/04* (2013.01); *F16H 61/0021* (2013.01); *F16H 61/0206* (2013.01); *F16H 61/143* (2013.01); *F16H 63/3483* (2013.01); *B60Y 2400/427* (2013.01); *F16D 2048/0221* (2013.01); *F16D 2048/0293* (2013.01); *F16H 3/66* (2013.01); *F16H 15/56* (2013.01); *F16H 2200/0069* (2013.01); *F16H 2200/2012* (2013.01); *F16H 2200/2046* (2013.01); *F16H 2200/2048* (2013.01); *F16H 2200/2066* (2013.01); *F16H 2200/2082* (2013.01)

(56) References Cited

U.S. PATENT DOCUMENTS

2015/0252893 A1\* 9/2015 Tachibanada ........... F16H 61/12
701/62
2016/0169375 A1 6/2016 Neelakantan et al.

FOREIGN PATENT DOCUMENTS

| | | |
|---|---|---|
| CN | 104033590 | 9/2014 |
| CN | 106062436 | 10/2016 |
| JP | 2014-196823 | 10/2014 |
| JP | 2015-048885 | 3/2015 |
| WO | 2015151550 | 10/2015 |

OTHER PUBLICATIONS

Office Action of China Counterpart Application, with English translation thereof, dated Jul. 9, 2019, pp. 1-13.

\* cited by examiner

|  | C1 | C2 | C3 | B1 | B2 | B3 | F1 | Gear ratio | Common ratio |
|---|---|---|---|---|---|---|---|---|---|
| Rvs |  |  | ○ |  | ○ |  | L | 4.008 |  |
| 1st |  |  |  | ○ | (○) |  | R/L | 5.233 | 1.554 |
| 2nd |  | ○ |  | ○ | ○ |  | R | 3.367 | 1.465 |
| 3rd |  |  | ○ | ○ | ○ |  | R | 2.298 | 1.348 |
| 4th |  | ○ | ○ | ○ |  |  | R | 1.705 | 1.251 |
| 5th | ○ |  | (○) | ○ |  |  | R | 1.363 | 1.363 |
| 6th | ○ | ○ | ○ |  |  |  | R | 1.000 | 1.273 |
| 7th | ○ |  | ○ |  | ○ |  | R | 0.786 | 1.196 |
| 8th | ○ | ○ |  |  | ○ |  | R | 0.657 | 1.126 |
| 9th | ○ |  |  |  | ○ | ○ | R | 0.584 | 1.120 |
| 10th | ○ | ○ |  |  |  | ○ | R | 0.520 |  |

FLUID PRESSURE CONTROL DEVICE

CROSS-REFERENCE TO RELATED APPLICATION

This application claims the priority benefit of Japan application serial no. 2017-068953, filed on Mar. 30, 2017. The entirety of the above-mentioned patent application is hereby incorporated by reference herein and made a part of this specification.

BACKGROUND

Technical Field

The disclosure relates to a fluid pressure control device configured to control fluid pressure of a transmission.

Related Art

In the related art, a fluid pressure control device configured to control a multi-plate clutch of an automatic transmission or the like by hydraulic pressure is known (for example, refer to Japanese Patent Application Laid-Open (JP-A) No. 2015-048885).

SUMMARY

In general, in an automatic transmission, a parking lock mechanism configured to prevent rotation of drive wheels such that they do not move when a vehicle is parked is provided. Controlling the parking lock mechanism with a hydraulic pressure control device can be considered. In this case, in the hydraulic pressure control device, switching a parking piston for a parking lock mechanism provided in the hydraulic pressure control device that switches between a parking locked state and a parking released state of the parking lock mechanism by hydraulic pressure supplied through a control valve can be conceived.

In addition, in the hydraulic pressure control device, when a hydraulic fluid reaches a high temperature, an amount of leakage oil leaking from gaps in the valve and the like increases. Therefore, when the temperature of the hydraulic fluid becomes higher, the provision of a control valve for raising a line pressure can be conceived.

Thus, when the hydraulic pressure control device includes a plurality of control valves, there is a limit to a reduction in size and weight.

The disclosure provides a fluid pressure control device whose size and weight can be made smaller than in the related art.

The disclosure provides a fluid pressure control device (for example, a hydraulic pressure control device 100 of an embodiment; hereinafter the same) that includes a plurality of control valves (for example, solenoid valves 122A to 122F of an embodiment; hereinafter the same) and a control unit (for example, a transmission control device ECU of an embodiment; hereinafter the same) configured to control the control valves. Any one (for example, the solenoid valve 122D of an embodiment; hereinafter the same) among the plurality of control valves has at least two functions among the following (1) to (6) functions: (1) a function of switching a state of a two-way clutch (for example, a two-way clutch F1 of an embodiment; hereinafter the same), (2) a function of switching a state of a parking lock mechanism (for example, a parking lock mechanism 40 of an embodiment; hereinafter the same), (3) a function of switching the supply of hydraulic pressure to a predetermined clutch (for example, a first brake B1 of an embodiment; hereinafter the same) that is put into an engaged state when a gear stage (for example, a first gear or a second gear of an embodiment; hereinafter the same) selected when travelling of a vehicle starts is set, (4) a function of controlling a line pressure adjustment valve (for example, a line pressure adjustment valve of an embodiment; hereinafter the same) so that a decrease in a line pressure is prevented when the temperature of a working fluid is a first predetermined temperature (for example, a high oil temperature of an embodiment; hereinafter the same) or higher, (5) a function of preventing the occurrence of a creep phenomenon in a neutral range when the temperature of the working fluid is a second predetermined temperature (for example, an extremely low oil temperature of an embodiment; hereinafter the same) or lower, and (6) a function of boosting a line pressure by performing switching to another proportional valve (for example, a linear solenoid valve of an embodiment; hereinafter the same) when the line pressure adjustment valve has failed.

According to the disclosure, since one control valve has at least two functions among the above (1) to (6) functions, it is possible to make the size and weight of the fluid pressure control device smaller than in a case in which a corresponding control valve is provided for each function.

In addition, in the disclosure, the fluid pressure control device includes a two-way clutch piston (for example, a two-way piston 212 of an embodiment; hereinafter the same) that controls hydraulic pressure of a transmission (for example, an automatic transmission 3 of an embodiment; hereinafter the same) and configured to switch a state of the two-way clutch. The transmission includes a rotor (for example, a third connected body Ca-Cb of an embodiment; hereinafter the same) and a detection unit (for example, a stroke sensor 214 of an embodiment; hereinafter the same) configured to detect a state of the two-way clutch. The two-way clutch is switchable between a reverse rotation prevention state in which forward rotation of the rotor is allowed and reverse rotation is prevented and a fixed state in which the rotor is fixed. When an instruction to put the two-way clutch into a fixed state is issued and the detection unit confirms that the two-way clutch is not in a fixed state, preferably, the control unit causes the control valve to supply fluid pressure at which the two-way clutch is put into a fixed state.

In addition, in the disclosure, the control valve switches the supply of fluid pressure to the predetermined clutch. When an instruction to put the two-way clutch into a fixed state has not been issued or when the detection unit confirms that the two-way clutch is in a fixed state, the control unit checks whether blocking of the supply of fluid pressure to the predetermined clutch has been requested. When blocking of the supply of fluid pressure to the predetermined clutch has been requested, preferably, the control unit causes the control valve to block the supply of fluid pressure to the predetermined clutch.

In addition, in the disclosure, preferably, when the range is switched from a traveling range (for example, a traveling range of an embodiment; hereinafter the same) to a non-traveling range (for example, a non-traveling range of an embodiment; hereinafter the same), the control valve blocks the supply of fluid pressure to a fluid pressure supply target (for example, a brake cut valve 128 of an embodiment; hereinafter the same) for a predetermined time.

In addition, in the disclosure, preferably, in the non-traveling range, fluid pressure is supplied to the fluid pressure supply target.

DESCRIPTION OF THE EMBODIMENTS

A transmission including a hydraulic pressure control device of an embodiment and a vehicle in which the transmission is mounted will be described with reference to the drawings.

Figure 1:
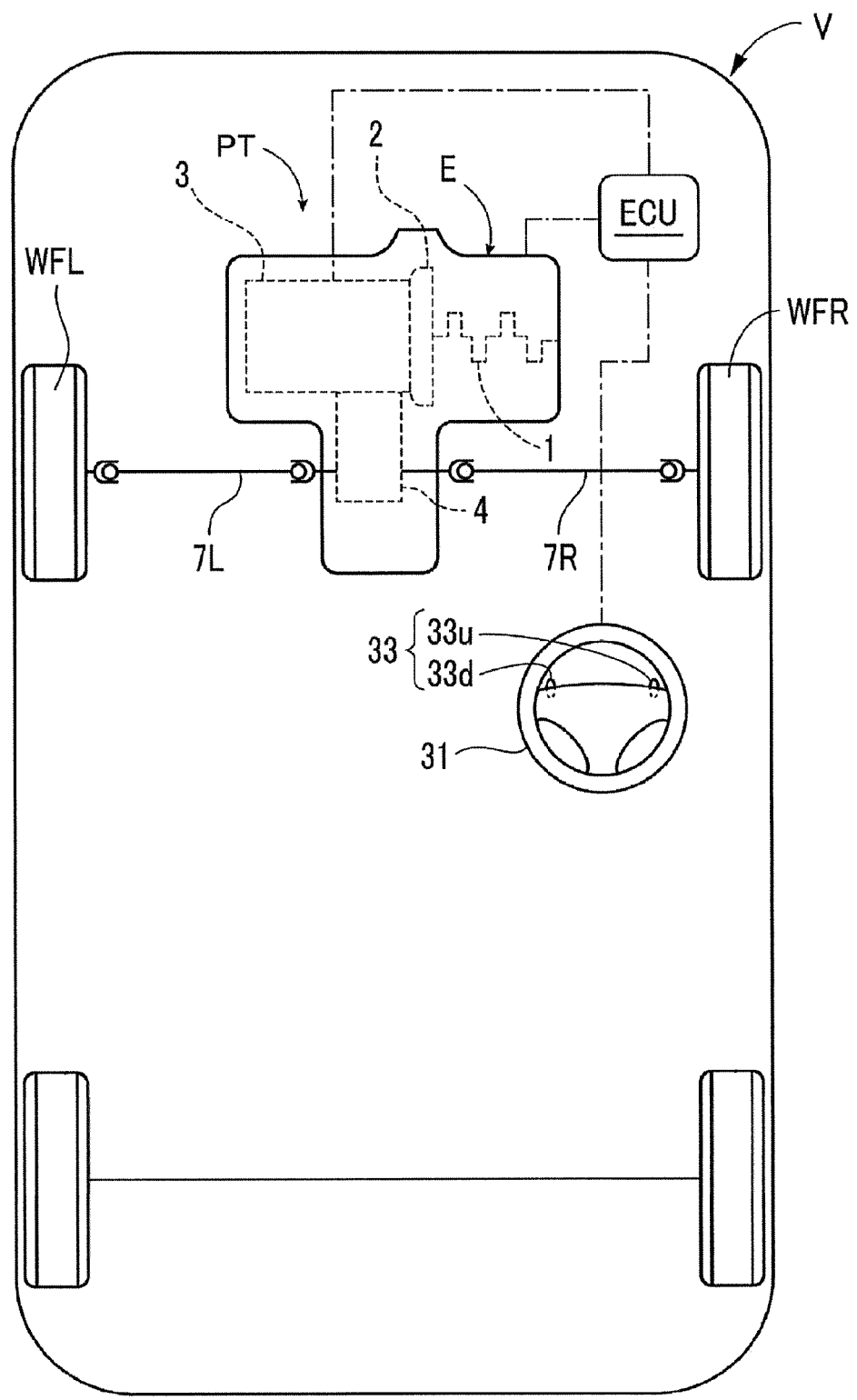
FIG. 1 is an explanatory diagram schematically showing a vehicle in which a transmission including a hydraulic pressure control device of an embodiment of the disclosure is mounted.

As shown in FIG. 1, in a vehicle V in which the automatic transmission including the hydraulic pressure control device of the present embodiment is mounted, an engine E (an internal combustion engine as a driving source; an electric motor may be used in place of the engine E) is mounted in a vehicle body sideways so that a crankshaft 1 is directed in the left to right direction in the vehicle body. A driving force output from the engine E is transmitted to a power transmission device PT. Then, the power transmission device PT adjusts a driving force of the engine E according to a selected gear ratio and transmits it to left and right front wheels WFL and WFR.

The power transmission device PT includes an automatic transmission 3 having a torque converter 2 connected to the crankshaft 1 and a front differential gear 4 connected to the automatic transmission 3.

The front differential gear 4 is connected to the left and right front wheels WFL and WFR through a front left axle 7L and a front right axle 7R.

Figure 2:
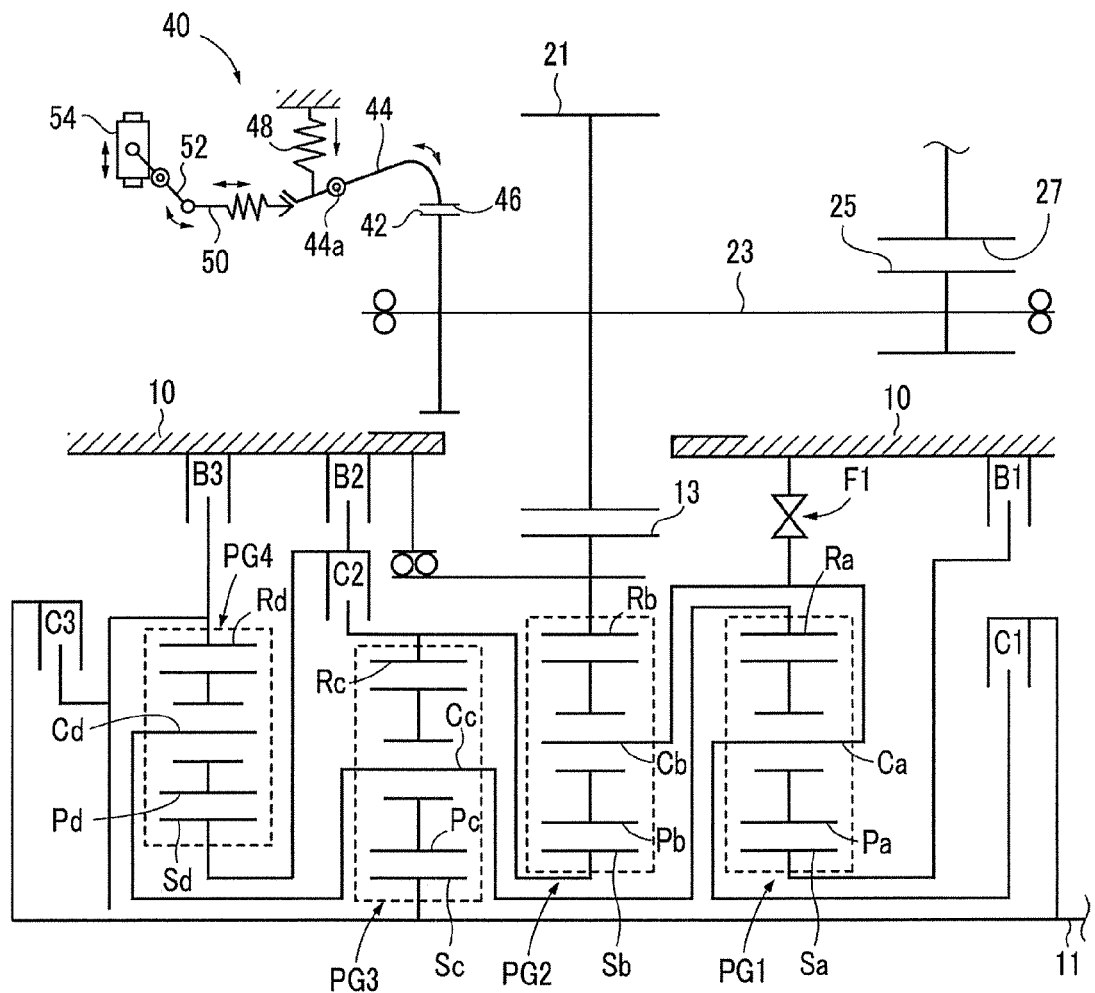
FIG. 2 is a skeleton diagram showing the transmission of the present embodiment.

FIG. 2 is a skeleton diagram showing a part of the automatic transmission 3 excluding the torque converter 2. The automatic transmission 3 includes an input shaft 11 that is rotatably pivotally supported in a transmission case 10 as a housing, as an input member to which a driving force output from the engine E is transmitted through the torque converter 2 including a lock-up clutch and a damper, and an output member 13 including an output gear that is disposed concentrically with the input shaft 11.

Rotation of the output member 13 is transmitted to left and right drive wheels (the front wheels WFL and WFR) of a vehicle through an idle gear 21 meshed with the output member 13, an idle shaft 23 pivotally supporting the idle gear 21, a final drive gear 25 pivotally supported on the idle shaft 23, and the front differential gear 4 including a final driven gear 27 meshed with the final drive gear 25. Here, in place of the torque converter 2, a frictionally engageable single plate type or multi-plate type starting clutch may be provided. In addition, a propeller shaft can be connected in place of the front differential gear 4 and applied to a rear wheel drive vehicle. In addition, a propeller shaft can be connected to the front differential gear 4 via a transfer and applied to a four-wheel drive vehicle.

In addition, the automatic transmission 3 of the present embodiment includes a parking lock mechanism 40. A parking gear 42 of the parking lock mechanism 40 is fixed to and rotates together with the idle shaft 23. A parking pole 44 pivotally supported on a support shaft 44a is disposed in the vicinity of the parking gear 42. A locking claw 46 is provided at an end on the side of the parking gear 42 of the parking pole 44. When the locking claw 46 is engaged with the parking gear 42, the state is put into a state (parking locked state) in which drive wheels (front wheels WFL and WFR) are unable to rotate through the idle shaft 23. The parking pole 44 is biased by a release spring 48 in a direction in which the locking claw 46 releases from the parking gear 42.

A cam 50 is disposed at the other end of the parking pole 44 in a freely moving forward and backward manner. When the cam 50 moves forward, the parking pole 44 swings against a biasing force of the release spring 48, and the locking claw 46 is engaged with the parking gear 42. When the cam 50 moves backward, the parking pole 44 returns to an original position due to a biasing force of the release spring 48, and the locking claw 46 and the parking gear 42 are disengaged.

A parking piston 54 is connected to the cam 50 via a link 52. The parking piston 54 is movable in its own axial direction due to hydraulic pressure. Then, when the parking piston 54 moves in the axial direction, the cam 50 moves forward and backward via the link 52.

Inside the transmission case 10 as a housing, four planetary gear mechanisms (first to fourth PG1 to PG4) are disposed concentrically with the input shaft 11 in order from the engine E side.

The first planetary gear mechanism PG1 is a so-called single pinion type planetary gear mechanism which includes a sun gear Sa, a ring gear Ra, and a carrier Ca that pivotally supports a pinion Pa meshed with the sun gear Sa and the ring gear Ra rotatably and revolvingly.

The so-called single pinion type planetary gear mechanism is also called a minus planetary gear mechanism or a negative planetary gear mechanism because the ring gear rotates in a direction different from that in the sun gear when the carrier is fixed and the sun gear is rotated. Here, in the so-called single pinion type planetary gear mechanism, when the ring gear is fixed and the sun gear is rotated, the carrier rotates in the same direction as the sun gear.

Figure 3:
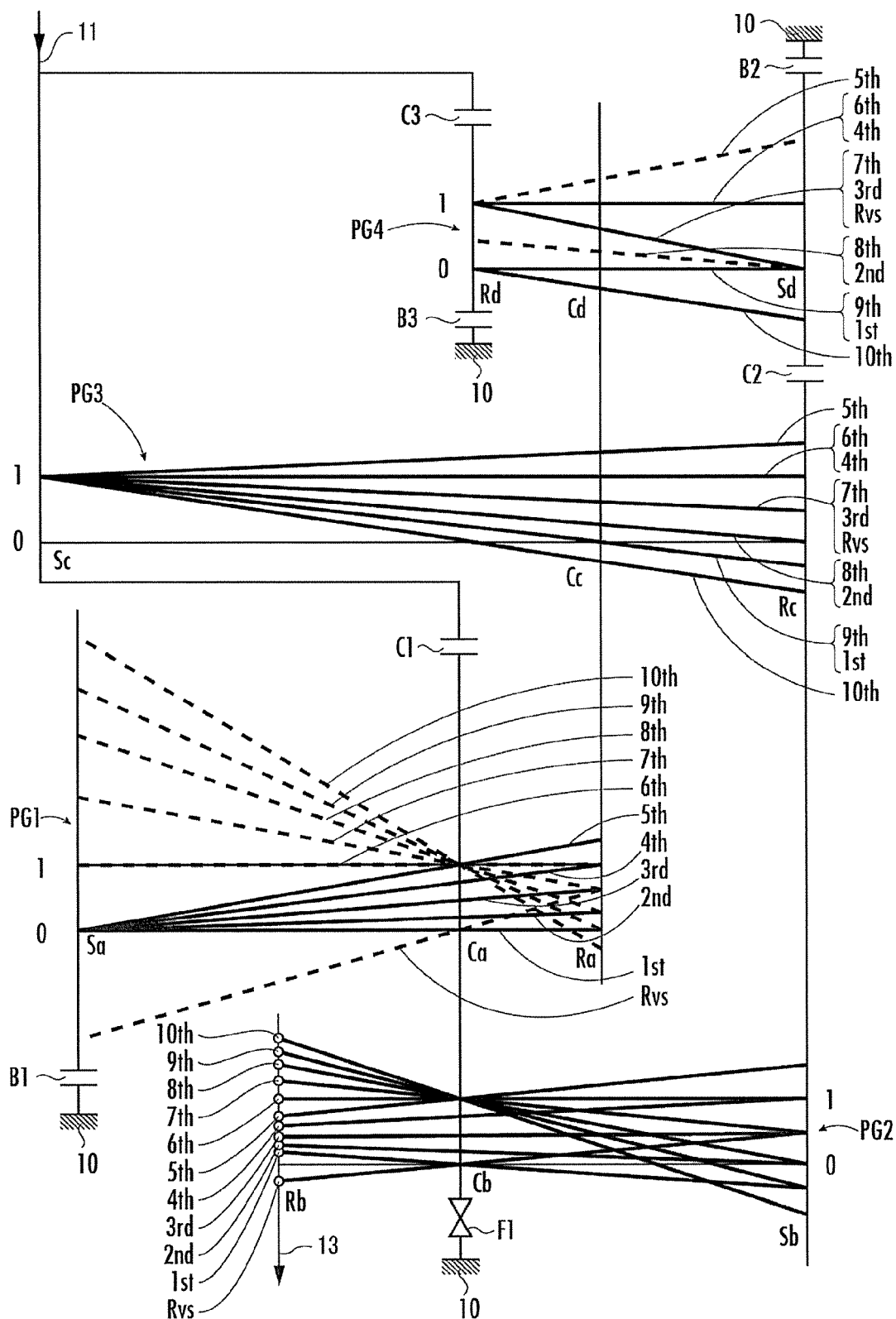
FIG. 3 is a collinear diagram of a planetary gear mechanism of the present embodiment.

With reference to a collinear diagram of the first planetary gear mechanism PG1 shown in the third part from the top in FIG. 3, when the three elements Sa, Ca, and Ra of the first planetary gear mechanism PG1 are referred to as a seventh element, an eighth element, and a ninth element from the left side, respectively, in the order of arrangement at intervals corresponding to the gear ratio in the collinear diagram, the seventh element is the sun gear Sa, the eighth element is the carrier Ca, and the ninth element is the ring gear Ra. A ratio between an interval between the sun gear Sa and the carrier Ca and an interval between the carrier Ca and the ring gear Ra is set to h:1 when the gear ratio of the first planetary gear mechanism PG1 is h.

The second planetary gear mechanism PG2 is a so-called single pinion type planetary gear mechanism which includes a sun gear Sb, a ring gear Rb, and a carrier Cb that pivotally supports a pinion Pb meshed with the sun gear Sb and the ring gear Rb rotatably and revolvingly.

With reference to a collinear diagram of the second planetary gear mechanism PG2 shown in the fourth part (the bottom part) from the top in FIG. 3, when the three elements Sb, Cb, and Rb of the second planetary gear mechanism PG2 are referred to as a tenth element, an eleventh element, and a twelfth element from the left side, respectively, in the order of arrangement at intervals corresponding to the gear ratio in the collinear diagram, the tenth element is the ring gear Rb, the eleventh element is the carrier Cb, and the twelfth element is the sun gear Sb. A ration between an interval between the sun gear Sb and the carrier Cb and an interval between the carrier Cb and the ring gear Rb is set to i:1 when the gear ratio of the second planetary gear mechanism PG2 is i.

The third planetary gear mechanism PG3 is a so-called single pinion type planetary gear mechanism which includes a sun gear Sc, a ring gear Rc, and a carrier Cc that pivotally supports a pinion Pc meshed with the sun gear Sc and the ring gear Rc rotatably and revolvingly.

With reference to a collinear diagram (a diagram that can express ratios between relative rotational speeds of the three elements including the sun gear, the carrier, and the ring gear by straight lines (speed lines)) of the third planetary gear mechanism PG3 shown in the second part from the top in FIG. 3, when the three elements Sc, Cc, and Rc of the third planetary gear mechanism PG3 are referred to as a first element, a second element, and a third element from the left side, respectively, in the order of arrangement at intervals corresponding to the gear ratio (the number of teeth of the ring gear/the number of teeth of the sun gear) in the collinear diagram, the first element is the sun gear Sc, the second element is the carrier Cc, and the third element is the ring gear Rc.

Here, a ratio between an interval between the sun gear Sc and the carrier Cc and an interval between the carrier Cc and the ring gear Rc is set to j:1 when the gear ratio of the third planetary gear mechanism PG3 is j. Here, in the collinear diagram, the lower horizontal line and the upper horizontal line (lines overlapping $4^{th}$ and $6^{th}$) indicate a rotational speed of "0" and "1" (the same rotational speed as the input shaft 11), respectively.

The fourth planetary gear mechanism PG4 is a so-called single pinion type planetary gear mechanism which includes a sun gear Sd, a ring gear Rd, and a carrier Cd that pivotally supports a pinion Pd meshed with the sun gear Sd and the ring gear Rd rotatably and revolvingly.

With reference to a collinear diagram of the fourth planetary gear mechanism PG4 shown in the first part (the top part) from the top in FIG. 3, when the three elements Sd, Cd, and Rd of the fourth planetary gear mechanism PG4 are referred to as a fourth element, a fifth element, and a sixth element from the left side, respectively, in the order of arrangement at intervals corresponding to the gear ratio in the collinear diagram, the fourth element is the ring gear Rd, the fifth element is the carrier Cd, and the sixth element is the sun gear Sd. A ratio between an interval between the sun gear Sd and the carrier Cd and an interval between the carrier Cd and the ring gear Rd is set to k:1 when the gear ratio of the fourth planetary gear mechanism PG4 is i.

The sun gear Sc (the first element) of the third planetary gear mechanism PG3 is connected to the input shaft 11. In addition, the ring gear Rb (the tenth element) of the second planetary gear mechanism PG2 is connected to the output member 13 including an output gear.

In addition, the carrier Cc (the second element) of the third planetary gear mechanism PG3, the carrier Cd (the fifth element) of the fourth planetary gear mechanism PG4, and the ring gear Ra (the ninth element) of the first planetary gear mechanism PG1 are connected to form a first connected body Cc-Cd-Ra. In addition, the ring gear Rc (the third element) of the third planetary gear mechanism PG3 and the sun gear Sb (the twelfth element) of the second planetary gear mechanism PG2 are connected to form a second connected body Rc-Sb. In addition, the carrier Ca (the eighth element) of the first planetary gear mechanism PG1 and the carrier Cb (the eleventh element) of the second planetary gear mechanism PG2 are connected to form a third connected body Ca-Cb.

In addition, the automatic transmission of the present embodiment includes seven engagement mechanisms including three first to third clutches C1 to C3, three first to third brakes B1 to B3, and one two-way clutch F1.

The first clutch C1 is a hydraulically actuated wet multi-plate clutch and is switchable between a connected state in which the sun gear Sc (the first element) of the third planetary gear mechanism PG3 and the third connected body Ca-Cb are connected and an open state in which the connection is disconnected.

The third clutch C3 is a hydraulically actuated wet multi-plate clutch and is switchable between a connected state in which the sun gear Sc (the first element) of the third planetary gear mechanism PG3 and the ring gear Rd (the fourth element) of the fourth planetary gear mechanism PG4 are connected and an open state in which the connection is disconnected.

The second clutch C2 is a hydraulically actuated wet multi-plate clutch and is switchable between a connected state in which the sun gear Sd (the sixth element) of the fourth planetary gear mechanism PG4 and the second connected body Rc-Sb are connected and an open state in which the connection is disconnected.

The two-way clutch F1 also has a function as a fourth brake B4, and allows forward rotation (rotation direction of the input shaft 11 and/or rotation in the same direction as a rotation direction of the output member 13 when a vehicle moves forward) of the third connected body Ca-Cb, and is switchable between a reverse rotation prevention state in which reverse rotation (in a direction of rotation opposite to forward rotation) is prevented and a fixed state in which the third connected body Ca-Cb is fixed to the transmission case 10.

In the reverse rotation prevention state, when a rotational force in a forward rotation direction is applied to the third connected body Ca-Cb, the two-way clutch F1 is put into an open state in which the rotation is allowed, and when a rotational force in a reverse rotation direction is applied, the two-way clutch F1 is put into a fixed state in which the rotation is prevented and the third connected body Ca-Cb is fixed to the transmission case 10. In the present embodiment, the two-way clutch corresponds to a switching mechanism.

The first brake B1 is a hydraulically actuated wet multi-plate clutch and is switchable between a fixed state in which the sun gear Sa (the seventh element) of the first planetary gear mechanism PG1 is fixed to the transmission case 10 and an open state in which the fixation is released.

The second brake B2 is a hydraulically actuated wet multi-plate clutch and is switchable between a fixed state in which the sun gear Sd (the sixth element) of the fourth planetary gear mechanism PG4 is fixed to the transmission case 10 and an open state in which the fixation is released. The third brake B3 is a hydraulically actuated wet multi-plate clutch and is switchable between a fixed state in which the ring gear Rd (the fourth element) of the fourth planetary gear mechanism PG4 is fixed to the transmission case 10 and an open state in which the fixation is released.

States of the clutches C1 to C3 and the brakes B1 to B3, and the two-way clutch F1 are switched on the basis of vehicle information such as a travel speed of a vehicle transmitted from an integrated control unit (not shown) by a transmission control device ECU including a transmission control unit (TCU) shown in FIG. 1.

The transmission control device ECU includes an electronic unit constituted by a CPU, a memory, and the like (not shown), and can receive predetermined vehicle information such as a travel speed and an accelerator opening of the vehicle V, a rotational speed and an output torque of the engine E, and operation information of a paddle shift lever 33, and execute a control program stored in a storage device such as a memory in the CPU, and thus controls the automatic transmission 3 (transmission mechanism).

As shown in FIG. 1, the paddle shift lever 33 is provided on a handle 31 of the vehicle V of the present embodiment, upshifting is performed by a manual operation when a right paddle 33u is pulled forward, and downshifting is performed by a manual operation when a left paddle 33d is pulled forward. An operation signal of the paddle shift lever 33 is transmitted to the transmission control device ECU.

Here, an operation unit for performing a manual operation is not limited to the paddle shift lever 33 of the embodiment. Another operation unit, for example, a shift lever disposed between a driver's seat and a passenger's seat or a button disposed on a handle may be used.

As shown in FIG. 2, on the axis of the input shaft 11, from the side of the engine E and the torque converter 2, the first clutch C1, the first planetary gear mechanism PG1, the second planetary gear mechanism PG2, the third planetary gear mechanism PG3, the second clutch C2, the fourth planetary gear mechanism PG4, and the third clutch C3 are disposed in that order.

Then, the third brake B3 is disposed radially outward from the fourth planetary gear mechanism PG4, the second brake B2 is disposed radially outward from the second clutch C2, the first brake B1 is disposed radially outward from the first clutch C1, and the two-way clutch F1 is disposed radially outward from the first planetary gear mechanism PG1.

In this manner, when the three brakes B1 to B3 and the two-way clutch F1 are disposed radially outward from a planetary gear mechanism or a clutch, it is possible to reduce the axial length of the automatic transmission 3 compared with when the brakes B1 to B3 and the two-way clutches F1 are disposed in parallel along the axis of the input shaft 11 together with the planetary gear mechanisms and the clutches. Here, the third brake B3 may be disposed radially outward from the third clutch C3 and the second brake B2 may be disposed radially outward from the fourth planetary gear mechanism PG4.

Next, a case in which gear stages of the automatic transmission 3 of the embodiment are set will be described with reference to FIG. 3 and FIG. 4.

In order to set a first gear, the two-way clutch F1 is put into a reverse rotation prevention state (R in FIG. 4) and the first brake B1 and the second brake B2 are put into a fixed state. When the two-way clutch F is put into a reverse rotation prevention state (R) and the first brake B1 is put into a fixed state, reverse rotation of the third connected body Ca-Cb and the sun gear Sa (the seventh element) of the first planetary gear mechanism PG1 are prevented, and rotational speeds of the third connected body Ca-Cb and the sun gear Sa (the seventh element) of the first planetary gear mechanism PG1 are "0."

Accordingly, three elements (seventh to ninth elements Sa, Ca, and Ra) of the first planetary gear mechanism PG1 are put into a locked state in which relative rotation is not possible, and a rotational speed of the first connected body Cc-Cd-Ra including the ring gear Ra (the ninth element) of the first planetary gear mechanism PG1 is "0." Then, a rotational speed of the ring gear Rb (the tenth element) of the second planetary gear mechanism PG2 to which the output member 13 is connected becomes "1st" shown in FIG. 3 and the first gear is set.

Here, in order to set the first gear, it is not necessary to set the second brake B2 in a fixed state. However, the second brake B2 is set in the first gear in a fixed state so that shifting from the first gear to a second gear to be described below can be performed smoothly. In addition, in order for an engine brake to be effective in the first gear, the two-way clutch F1 may be switched from a reverse rotation prevention state (R) to a fixed state (L).

In order to set the second gear, the two-way clutch F1 is put into a reverse rotation prevention state (R), the first brake B1 and the second brake B2 are put into a fixed state, and the second clutch C2 is put into a connected state. When the two-way clutch F1 is put into a reverse rotation prevention state, forward rotation of the third connected body Ca-Cb is allowed. In addition, when the first brake B1 is put into a fixed state, a rotational speed of the sun gear Sa (the seventh element) of the first planetary gear mechanism PG1 is "0." In addition, when the second brake B2 is put into a fixed state, a rotational speed of the sun gear Sd (the sixth element) of the fourth planetary gear mechanism PG4 is "0."

In addition, when the second clutch C2 is put into a connected state, a rotational speed of the second connected body Rc-Sb is "0" that is the same speed as a rotational speed of the sun gear Sd (the sixth element) of the fourth planetary gear mechanism PG4. Then, a rotational speed of the ring gear Rb (the tenth element) of the second planetary gear mechanism PG2 to which the output member 13 is connected is "$2^{nd}$" shown in FIG. 3, and the second gear is set.

In order to set a third gear, the two-way clutch F1 is put into a reverse rotation prevention state, the first brake B1 and the second brake B2 are put into a fixed state, and the third clutch C3 is put into a connected state. When the two-way clutch F is put into a reverse rotation prevention state, forward rotation of the third connected body Ca-Cb is allowed. In addition, when the first brake B1 is put into a fixed state, a rotational speed of the sun gear Sa (the seventh element) of the first planetary gear mechanism PG1 is "0." In addition, when the second brake B2 is put into a fixed state, a rotational speed of the sun gear Sd (the sixth element) of the fourth planetary gear mechanism PG4 is "0."

In addition, when the third clutch C3 is put into a connected state, a rotational speed of the ring gear Rd (the fourth element) of the fourth planetary gear mechanism PG4 is "1" that is the same speed as a rotational speed of the sun gear Sc (the first element) of the third planetary gear mechanism PG3 connected to the input shaft 11. Since a rotational speed of the sun gear Sd (the sixth element) of the fourth planetary gear mechanism PG4 is "0" and a rotational speed of the ring gear Rd (the fourth element) is "1," a rotational speed of the carrier Cd (the fifth element), that is, a rotational speed of the first connected body Cc-Cd-Ra is k/(k+1).

Then, a rotational speed of the ring gear Rb (the tenth element) of the second planetary gear mechanism PG2 to which the output member 13 is connected is "$3^{rd}$" shown in FIG. 3, and the third gear is set.

In order to set a fourth gear, the two-way clutch F1 is put into a reverse rotation prevention state, the first brake B1 is put into a fixed state, and the second clutch C2 and the third clutch C3 are put into a connected state. When the two-way clutch F1 is put into a reverse rotation prevention state, forward rotation of the third connected body Ca-Cb is allowed. In addition, when the first brake B1 is put into a fixed state, a rotational speed of the sun gear Sa (the seventh element) of the first planetary gear mechanism PG1 is "0."

In addition, when the second clutch C2 is put into a connected state, the sun gear Sd (the sixth element) of the fourth planetary gear mechanism PG4 and the second connected body Rc-Sb rotate at the same speed. Accordingly, between the third planetary gear mechanism PG3 and the fourth planetary gear mechanism PG4, the carrier Cc (the second element) and the carrier Cd (the fifth element) are connected, and the ring gear Rc (the third element) and the sun gear Sd (the sixth element) are connected. In the fourth gear in which the second clutch C2 is put into a connected state, one collinear diagram including four elements can be drawn by the third planetary gear mechanism PG3 and the fourth planetary gear mechanism PG4.

Then, when the third clutch C3 is put into a connected state, a rotational speed of the ring gear Rd (the fourth element) of the fourth planetary gear mechanism PG4 is "1" that is the same speed as a rotational speed of the sun gear Sc (the first element) of the third planetary gear mechanism PG3, and rotational speeds of two elements among four elements constituted by the third planetary gear mechanism PG3 and the fourth planetary gear mechanism PG4 are the same speed of "1."

Accordingly, elements of the third planetary gear mechanism PG3 and the fourth planetary gear mechanism PG4 are put into a locked state in which relative rotation is not possible, and rotational speeds of all elements of the third planetary gear mechanism PG3 and the fourth planetary gear mechanism PG4 are "1." Then, a rotational speed of the third connected body Ca-Cb is h/(h+1), and a rotational speed of the ring gear Rb (the tenth element) of the second planetary gear mechanism PG2 to which the output member 13 is connected is "$4^{th}$" shown in FIG. 3, and the fourth gear is set.

In order to set a fifth gear, the two-way clutch F is put into a reverse rotation prevention state, the first brake B1 is put into a fixed state, and the first clutch C1 and the third clutch C3 are put into a connected state. When the two-way clutch F1 is put into a reverse rotation prevention state, forward rotation of the third connected body Ca-Cb is allowed. In addition, when the first brake B1 is put into a fixed state, a rotational speed of the sun gear Sa (the seventh element) of the first planetary gear mechanism PG1 is "0."

In addition, when the first clutch C1 is put into a connected state, a rotational speed of the third connected body Ca-Cb is "1" that is the same speed as a rotational speed of the sun gear Sc (the first element) of the third planetary gear mechanism PG3. Then, a rotational speed of the ring gear Rb (the tenth element) of the second planetary gear mechanism PG2 to which the output member 13 is connected is "$5^{th}$" shown in FIG. 3, and the fifth gear is set.

Here, in order to set the fifth gear, it is not necessary to set the third clutch C3 in a connected state. However, since it is necessary to set the third clutch C3 in a connected state in the fourth gear and a sixth gear to be described below, the fifth gear is also put into a connected state so that downshifting from the fifth gear to the fourth gear and upshifting from the fifth gear to the sixth gear to be described below are performed smoothly.

In order to set the sixth gear, the two-way clutch F1 is put into a reverse rotation prevention state and three clutches (first to third clutches C1 to C3) are put into a connected state. When the two-way clutch F is put into a reverse rotation prevention state, forward rotation of the third connected body Ca-Cb is allowed.

In addition, when the second clutch C2 and the third clutch C3 are put into a connected state, as described in the fourth gear, elements of the third planetary gear mechanism PG3 and the fourth planetary gear mechanism PG4 are put into a state in which relative rotation is not possible and a rotational speed of the second connected body Rc-Sb is "1." In addition, when the first clutch C1 is put into a connected state, a rotational speed of the third connected body Ca-Cb is "1."

Accordingly, in the second planetary gear mechanism PG2, the carrier Cb (the eleventh element) and the sun gear Sb (the twelfth element) are the same speed of "1," and elements are put into a locked state in which relative rotation is not possible. Then, a rotational speed of the ring gear Rb (the tenth element) of the second planetary gear mechanism PG2 to which the output member 13 is connected is "1" of "$6^{th}$" shown in FIG. 3, and the sixth gear is set.

In order to set a seventh gear, the two-way clutch F1 is put into a reverse rotation prevention state, the second brake B2 is put into a fixed state, and the first clutch C1 and the third clutch C3 are put into a connected state. When the two-way clutch F1 is put into a reverse rotation prevention state, forward rotation of the third connected body Ca-Cb is allowed.

In addition, when the second brake B2 is put into a fixed state, a rotational speed of the sun gear Sd (the sixth element) of the fourth planetary gear mechanism PG4 is "0." In addition, when the third clutch C3 is put into a connected state, a rotational speed of the ring gear Rd (the fourth element) of the fourth planetary gear mechanism PG4 is "1" that is the same speed as a rotational speed of the sun gear Sc (the first element) of the third planetary gear mechanism PG3, and a rotational speed of the first connected body Cc-Cd-Ra including the carrier Cd (the fifth element) of the fourth planetary gear mechanism PG4 is k/(k+1).

In addition, when the first clutch C1 is put into a connected state, a rotational speed of the third connected body Ca-Cb is "1" that is the same speed as a rotational speed of the sun gear Sc (the first element) of the third planetary gear mechanism PG3 connected to the input shaft 11. Then, a rotational speed of the ring gear Rb (the tenth element) of the second planetary gear mechanism PG2 to which the output member 13 is connected is "$7^{th}$" shown in FIG. 3, and the seventh gear is set.

In order to set an eighth gear, the two-way clutch F1 is put into a reverse rotation prevention state, the second brake B2 is put into a fixed state, and the first clutch C1 and the second clutch C2 are put into a connected state. When the two-way clutch F is put into a reverse rotation prevention state, forward rotation of the third connected body Ca-Cb is allowed.

In addition, when the second brake B2 is put into a fixed state, a rotational speed of the sun gear Sd (the sixth element) of the fourth planetary gear mechanism PG4 is "0." In addition, when the second clutch C2 is put into a connected state, a rotational speed of the second connected body Rc-Sb is "0" that is the same speed as a rotational speed of the sun gear Sd (the sixth element) of the fourth planetary gear mechanism PG4.

In addition, when the first clutch C1 is put into a connected state, a rotational speed of the third connected body Ca-Cb is "1" that is the same speed as a rotational speed of the sun gear Sc (the first element) of the third planetary gear mechanism PG3. Then, a rotational speed of the ring gear Rb (the tenth element) of the second planetary gear mechanism PG2 to which the output member 13 is connected is "8$^{th}$" shown in FIG. 3, and the eighth gear is set.

In order to set a ninth gear, the two-way clutch F1 is put into a reverse rotation prevention state, the second brake B2 and the third brake B3 are put into a fixed state, and the first clutch C1 is put into a connected state. When the two-way clutch F1 is put into a reverse rotation prevention state, forward rotation of the third connected body Ca-Cb is allowed.

In addition, when the second brake B2 is put into a fixed state, a rotational speed of the sun gear Sd (the sixth element) of the fourth planetary gear mechanism PG4 is "0." In addition, when the third brake B3 is put into a fixed state, a rotational speed of the ring gear Rd (the fourth element) of the fourth planetary gear mechanism PG4 is "0." Therefore, elements Sd, Cd, and Rd of the fourth planetary gear mechanism PG4 are put into a locked state in which relative rotation is not possible, and a rotational speed of the first connected body Cc-Cd-Ra including the carrier Cd (the fifth element) of the fourth planetary gear mechanism PG4 is "0."

In addition, when the first clutch C1 is put into a connected state, a rotational speed of the third connected body Ca-Cb is "1" that is the same speed as a rotational speed of the sun gear Sc (the first element) of the third planetary gear mechanism PG3. Then, a rotational speed of the ring gear Rb (the tenth element) of the second planetary gear mechanism PG2 to which the output member 13 is connected is "9$^{th}$" shown in FIG. 3, and the ninth gear is set.

In order to set a tenth gear, the two-way clutch F1 is put into a reverse rotation prevention state, the third brake B3 is put into a fixed state, and the first clutch C1 and the second clutch C2 are put into a connected state. When the two-way clutch F1 is put into a reverse rotation prevention state, forward rotation of the third connected body Ca-Cb is allowed.

In addition, when the second clutch C2 is put into a connected state, the second connected body Rc-Sb and the sun gear Sd (the sixth element) of the fourth planetary gear mechanism PG4 rotate at the same speed. In addition, when the third brake B3 is put into a fixed state, a rotational speed of the ring gear Rd (the fourth element) of the fourth planetary gear mechanism PG4 is "0." In addition, when the first clutch C1 is put into a connected state, a rotational speed of the third connected body Ca-Cb is "1" that is the same speed as a rotational speed of the sun gear Sc (the first element) of the third planetary gear mechanism PG3. Then, a rotational speed of the ring gear Rb (the tenth element) of the second planetary gear mechanism PG2 to which the output member 13 is connected is "10$^{th}$" shown in FIG. 3, and the tenth gear is set.

In order to set a reverse gear, the two-way clutch F1 is put into a fixed state (L in FIG. 4), the second brake B2 is put into a fixed state, and the third clutch C3 is put into a connected state. When the second brake B2 is put into a fixed state and the third clutch C3 is put into a connected state, a rotational speed of the first connected body Cc-Cd-Ra is k/(k+1). In addition, when the two-way clutch F1 is put into a fixed state, a rotational speed of the third connected body Ca-Cb is "0." Then, a rotational speed of the ring gear Rb (the tenth element) of the second planetary gear mechanism PG2 to which the output member 13 is connected is reverse rotation "Rvs" shown in FIG. 3, and the reverse gear is set.

Here, speed lines indicated by dashed lines in FIG. 3 indicate that elements of other planetary gear mechanisms rotate (idle) following a planetary gear mechanism that transmits power among the four planetary gear mechanisms PG1 to PG4.

Figures 4, 5:
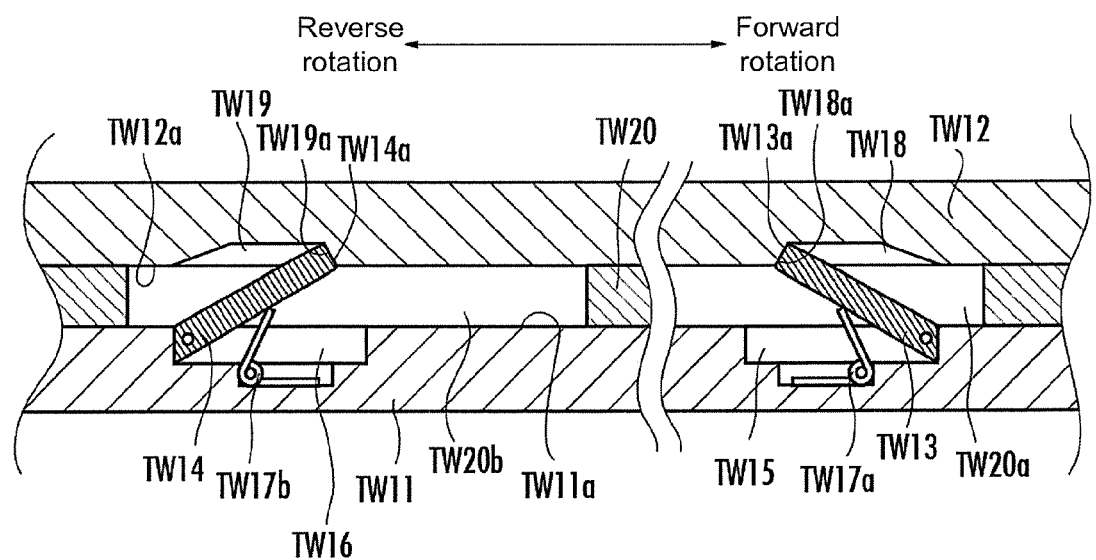
FIG. 4 is an explanatory diagram showing an engaged state of engagement mechanisms at gear stages of the present embodiment.
FIG. 5 is an explanatory diagram showing a fixed state of a two-way clutch of the present embodiment in a cross section.

FIG. 4 is a diagram collectively showing states of the clutches C1 to C3, the brakes B1 to B3, and the two-way clutch F1 at the above-described gear stages. "O" in the columns of the three clutches (first to third clutches C1 to C3), and the three brakes (first to third brakes B1 to B3) indicate a connected state or a fixed state, and blank columns indicate an open state. In addition, "R" in the column of the two-way clutch F1 indicates a reverse rotation prevention state and "L" indicates a fixed state.

In addition, the underlined "R" and "L" indicate that a rotational speed of the third connected body Ca-Cb is "0" due to the action of the two-way clutch F1. In addition, "R/L" indicates a state that is a reverse rotation prevention state "R" normally but switched to the fixed state "L" when an engine brake is effective.

In addition, FIG. 4 shows gear ratios (a rotational speed of the input shaft 11/a rotational speed of the output member 13) and common ratios (a ratio of gear ratios between gear stages; a value obtained by dividing a gear ratio of a predetermined gear stage by a gear ratio of a gear stage that is one speed level higher than the predetermined gear stage) at gear stages when a gear ratio h of the first planetary gear mechanism PG1 is 2.681, a gear ratio i of the second planetary gear mechanism PG2 is 1.914, a gear ratio j of the third planetary gear mechanism PG3 is 2.734, and a gear ratio k of the fourth planetary gear mechanism PG4 is 1.614. Accordingly, it can be understood that common ratios can be appropriately set.

Next, the two-way clutch F1 will be described in detail with reference to FIG. 5 to FIG. 8. The two-way clutch F1 is switchable between a fixed state in which the third connected body Ca-Cb is fixed to the transmission case 10 and a reverse rotation prevention state in which forward rotation of the third connected body Ca-Cb is allowed and reverse rotation is prevented.

Figure 6:
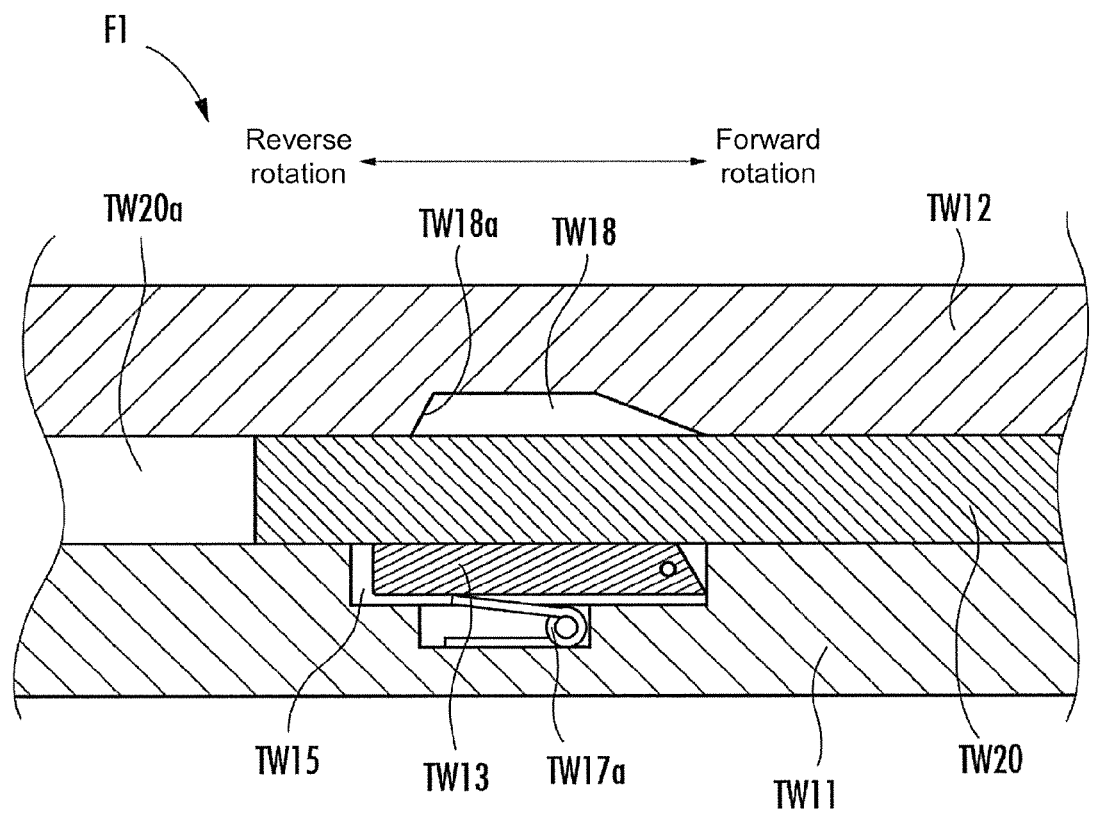
FIG. 6 is an explanatory diagram showing a reverse rotation prevention state of the two-way clutch of the present embodiment in a cross section.
Figure 7:
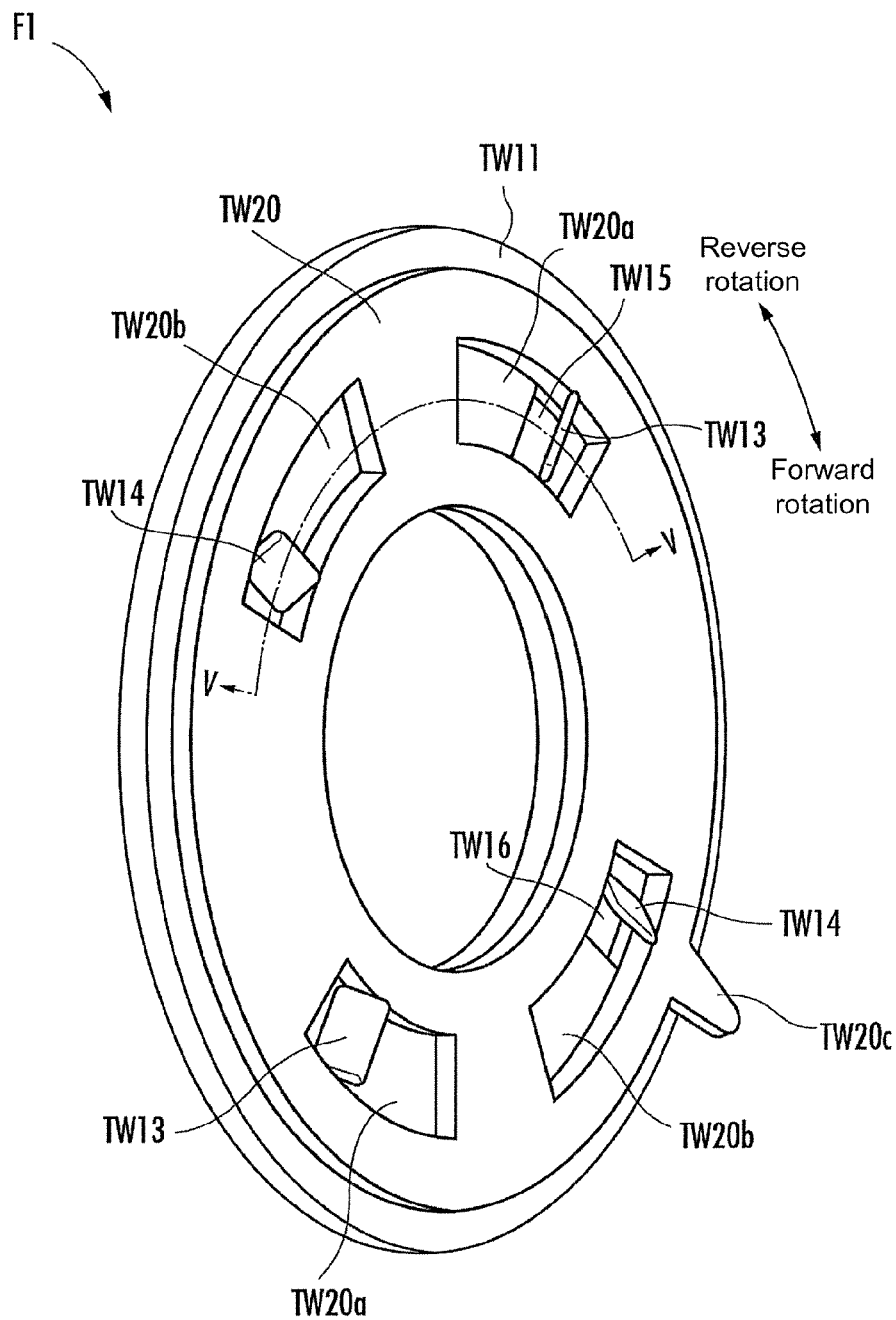
FIG. 7 is a perspective view showing a fixed state of the two-way clutch of the present embodiment.

As shown in cross sections in FIG. 5 and FIG. 6, the two-way clutch F1 includes a fixing plate TW11 and a rotating plate TW12 fixed to the transmission case 10. As shown in FIG. 7, the fixing plate TW11 is formed in a ring shape (donut shape). In addition, although not shown in FIG. 7, the rotating plate TW12 is formed in a ring shape (donut shape) similarly to the fixing plate TW11, and the fixing plate TW11 and the rotating plate TW12 are disposed concentrically.

As shown in FIG. 5, on a facing surface TW11a that faces the rotating plate TW12 on the fixing plate TW11, a plate-like forward rotation prevention side swinging part TW13 in which an end TW13a on the other side (a direction in which the rotating plate TW12 rotates reversely) in a circumferential direction swings using an end on one side (a direction in which the rotating plate TW12 rotates forward) in the circumferential direction of the fixing plate TW11 as a shaft, and a plate-like reverse rotation prevention side swinging part TW14 in which an end TW14a on one side (forward rotation direction) in the circumferential direction swings using an end of the other side (reverse rotation direction) in the circumferential direction of the fixing plate TW11 as a shaft are provided.

In addition, on the facing surface TW11a of the fixing plate TW11, concave accommodation units TW15 and TW16 in which the forward rotation prevention side swinging part TW13 and the reverse rotation prevention side swinging part TW14 can be accommodated are provided. On bottoms of the accommodation units TW15 and TW16, biasing members TW17a and TW17b including springs for biasing the swinging parts TW13 and TW14 are provided so that the swinging ends TW13a and TW14a of the corresponding swinging parts TW13 and TW14 protrude from the accommodation units TW15 and TW16.

On a facing surface TW12a that faces the fixing plate TW11 on the rotating plate TW12, holes TW18 and TW19 are provided at positions corresponding to the swinging parts TW13 and TW14. At the first hole TW18 provided at a position corresponding to the forward rotation prevention side swinging part TW13, a first engagement part TW18a having a stepped shape that can be engaged with the swing end TW13a of the forward rotation prevention side swinging part TW13 is provided such that it is positioned on the other side (a reverse rotation direction side) in the circumferential direction of the rotating plate TW12.

At the second hole TW19 provided at a position corresponding to the reverse rotation prevention side swinging part TW14, a second engagement part TW19a having a stepped shape that can be engaged with the swing end TW14a of the reverse rotation prevention side swinging part TW14 is provided such that it is positioned on one side (a forward rotation direction side) in the circumferential direction of the rotating plate TW12.

As shown in FIG. 5 and FIG. 7, when the end TW13a of the forward rotation prevention side swinging part TW13 and the first engagement part TW18a are engageable and the end TW14a of the reverse rotation prevention side swinging part TW14 and the second engagement part TW19a are engageable, both forward rotation and reverse rotation of the rotating plate TW12 are prevented. Accordingly, a state in which the ends TW13a and TW14a and the engagement parts TW18a and TW19a corresponding thereto are engaged with each other is the fixed state in the two-way clutch F1 of the present embodiment.

A switch plate TW20 is interposed between the fixing plate TW11 and the rotating plate TW12. As shown in FIG. 7, the switch plate TW20 is formed in a ring shape (donut shape). On the switch plate TW20, notch holes TW20a and TW20b are provided at positions corresponding to the swinging parts TW13 and TW14.

Figure 8:
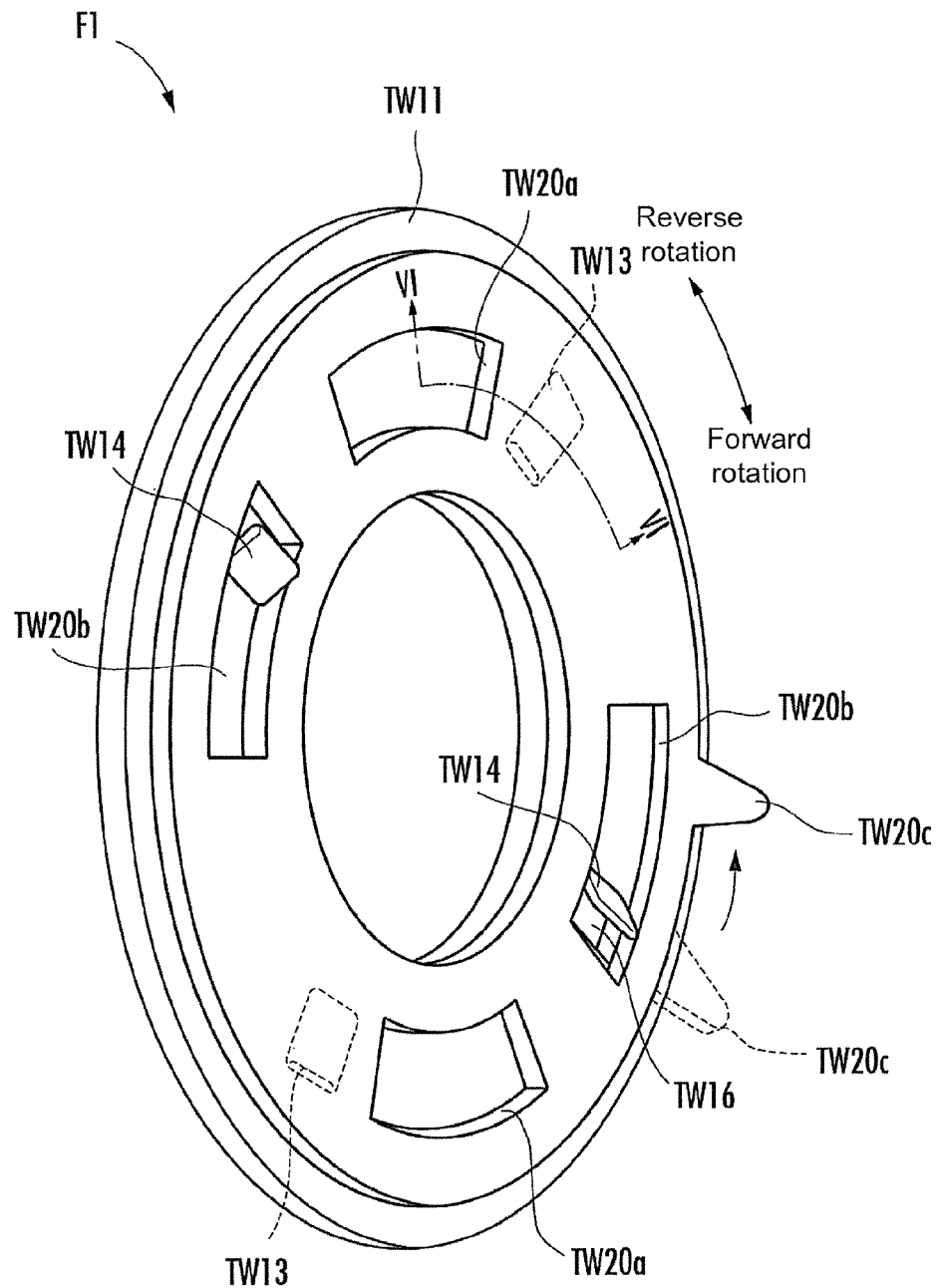
FIG. 8 is a perspective view showing a reverse rotation prevention state of the two-way clutch of the present embodiment.

A protrusion TW20c that protrudes radially outward is provided at the outer edge of the switch plate TW20. As shown in FIG. 8, the switch plate TW20 is freely swingable with respect to the fixing plate TW11.

When the switch plate TW20 is swung from the fixed state shown in FIG. 7 to the state shown in FIG. 8, as shown in FIG. 6, the first notch hole TW20a corresponding to the forward rotation prevention side swinging part TW13 exceeds the forward rotation prevention side swinging part TW13, and the forward rotation prevention side swinging part TW13 is pushed to the switch plate TW20 against the biasing force of the biasing member TW17a, and is accommodated in the accommodation unit TW15. Accordingly, engagement of the end TW13a of the forward rotation prevention side swinging part TW13 and the first engagement part TW18a is prevented. Accordingly, rotation of the rotating plate TW12 on the forward rotation side is allowed.

In addition, as shown in FIG. 8, in the second notch hole TW20b corresponding to the reverse rotation prevention side swinging part TW14, even if the switch plate TW20 is swung from the fixed state shown in FIG. 7 to the state shown in FIG. 8, the end TW14a can be engaged with the second engagement part TW19a without accommodating the reverse rotation prevention side swinging part TW14 in the accommodation unit TW16.

Accordingly, the state shown in FIG. 6 and FIG. 8 is a reverse rotation prevention state in the two-way clutch F1 of the present embodiment.

Figure 9:
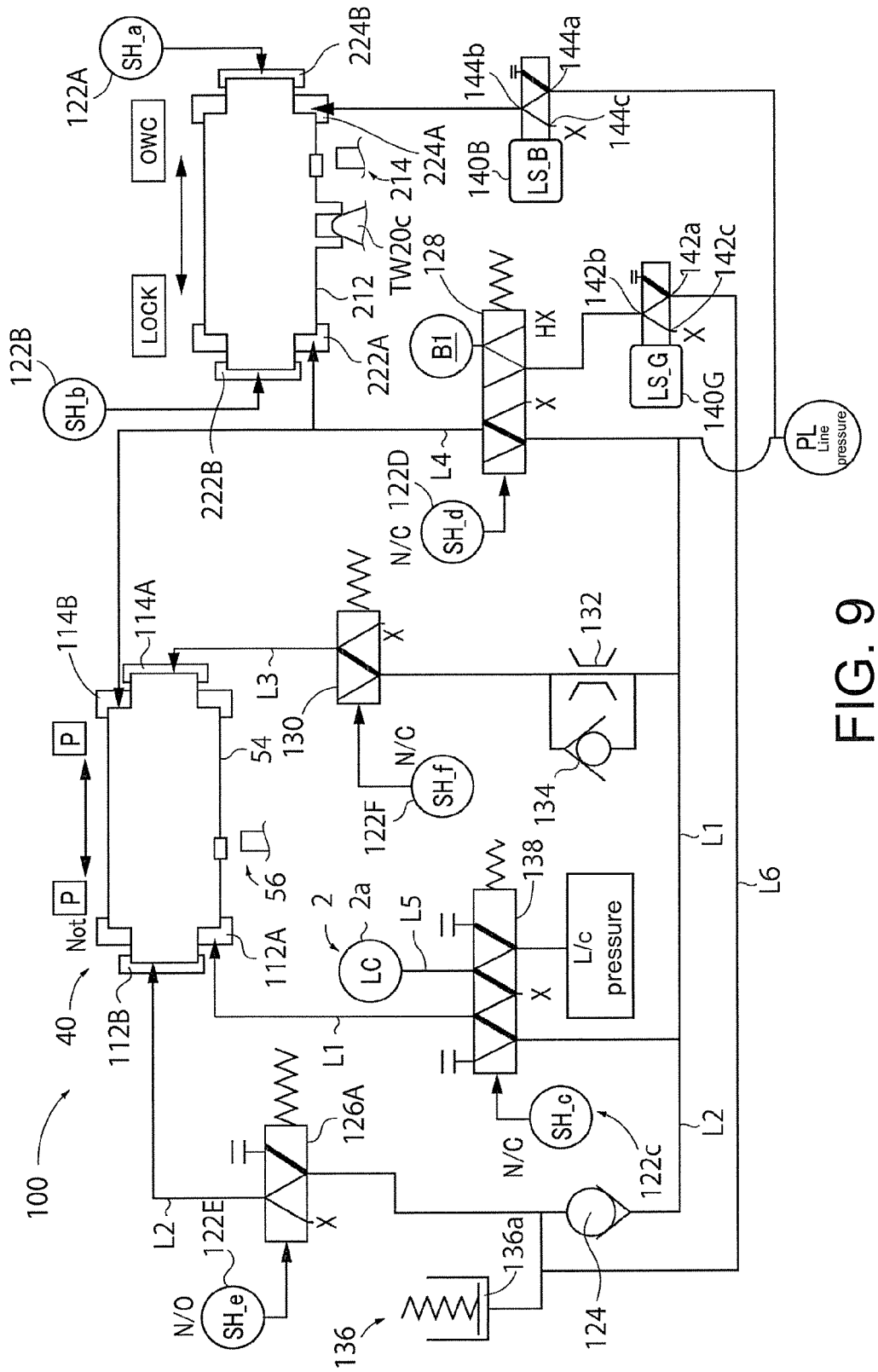
FIG. 9 is an explanatory diagram showing a hydraulic pressure control device of the present embodiment.

Next, a hydraulic pressure control device 100 included in the automatic transmission 3 of the present embodiment will be described with reference to FIG. 9. As shown in FIG. 9, the hydraulic pressure control device 100 controls operations of the parking piston 54 of the parking lock mechanism 40.

The hydraulic pressure control device 100 includes an on and off type solenoid valve 122C configured to supply a line pressure supplied from a hydraulic pump (not shown) to an oil passage L1 to a first locking oil chamber 112A and an on and off type solenoid valve 122E configured to supply a line pressure of an oil passage L2 connected to a downstream side of the oil passage L1 to a second locking oil chamber 112B. A check valve 124 is interposed in the oil passage L2 at a position upstream from the solenoid valve 122E. When the solenoid valve 122C is opened, a line pressure is directly supplied to the first locking oil chamber 112A. When the solenoid valve 122E is opened, a first ball valve 126A is opened. The solenoid valve 122C is a normally closed type, and the solenoid valve 122E is a normally open type.

In addition, the hydraulic pressure control device 100 includes an on and off type solenoid valve 122F configured to supply a line pressure to a first unlocking oil chamber 114A through an oil passage L3 and an on and off type solenoid valve 122D configured to supply a line pressure of an oil passage L4 branched upstream from the check valve 124 to a second unlocking oil chamber 114B.

A line pressure is directly supplied to the second unlocking oil chamber 114B through a brake cut valve 128 that is operated by the solenoid valve 122D.

When the solenoid valve 122F is opened, a spool of a parking inhibit valve 130 moves to the right side in FIG. 9 against a biasing force of the spring, and thus a line pressure is supplied to the first unlocking oil chamber 114A. On the other hand, when the solenoid valve 122F is closed, a spool of the parking inhibit valve 130 is biased due to the spring and moves to the left side in FIG. 9, and thus a line pressure of the first unlocking oil chamber 114A is drained. The solenoid valve 122F is a normally closed type, and the solenoid valve 122D is a normally closed type.

A second choke 132 narrowing a flow path is provided upstream from the parking inhibit valve 130 of the oil passage U. The second choke 132 is constituted by a slot groove of a separation plate. In this manner, when the second choke 132 is constituted by a slot groove of a separation plate, there is no need to separately provide a second choke member, it is possible to reduce the number of components, and it is possible to simply assembly of the parking lock device.

In addition, a second check valve 134 is provided in parallel to the second choke 132 and prevents supply of hydraulic pressure to the first unlocking oil chamber 114A and allows release of hydraulic pressure from the first unlocking oil chamber 114A. When the second check valve 134 is provided, it is possible to quickly release hydraulic pressure.

An accumulation chamber 136a of an accumulator 136 is connected to the oil passage L2 between the check valve 124 and the solenoid valve 122E.

A lock-up clutch shift valve 138 is connected to the oil passage L1 downstream from the solenoid valve 122C, and a lock-up clutch pressure of an oil passage L5 is supplied to a lock-up clutch 2a of the torque converter 2 which is a start mechanism through the lock-up clutch shift valve 138.

In addition, the first brake B1 is connected to an oil passage L6 which is a hydraulic engagement device for shifting downstream from the check valve 124, and a linear solenoid valve 140G and the brake cut valve 128 are disposed on the oil passage L6. Opening and closing of the brake cut valve 128 are driven by the solenoid valve 122D. The linear solenoid valve 140G includes an import 142a, an outport 142b, and a drain port 142c and can adjust hydraulic pressure input from the import 142a and output it from the outport 142b, and release hydraulic pressure from the outport 142b through the drain port 142c.

In addition, the hydraulic pressure control device 100 includes a two-way piston 212 that is engaged with the protrusion TW20c of the switch plate TW20 of the two-way clutch F1 and switches the switch plate TW20 between a reverse rotation prevention state and a fixed state by hydraulic pressure.

In the two-way piston 212, similarly to the parking piston 54, at one end of the two-way piston 212 accommodated in a cylinder (not shown), a first reverse rotation prevention oil chamber 222A and a second reverse rotation prevention oil chamber 222B for moving the two-way piston 212 to a side in a reverse rotation prevention state ("OWC" in FIG. 9) are provided.

At the other end of the two-way piston 212, a first fixing oil chamber 224A and a second fixing oil chamber 224B for moving the two-way piston 212 to a side in a fixed state ("LOCK" in FIG. 9) are provided. A stroke sensor 214 is provided in the two-way piston 212, and a position of the two-way piston 212 is detected by the stroke sensor 214 and is transmitted to the transmission control device ECU.

The first reverse rotation prevention oil chamber 222A is connected to the oil passage L4. A line pressure can be supplied to the second reverse rotation prevention oil chamber 222B through a solenoid valve 122B. A line pressure can be supplied to the first fixing oil chamber 224A through a linear solenoid valve 140B.

The linear solenoid valve 140B includes an import 144a, an outport 144b, and a drain port 144c, and can adjust a line pressure input from the import 144a and output it from the outport 144b, and release hydraulic pressure from the outport 144b through the drain port 144c.

A line pressure can be supplied to the second fixing oil chamber 224B through a solenoid valve 122A.

Next, operations of the present embodiment having the above configuration will be described.

When a driver selects a D range or a R range using a shift operation unit such as a shift lever and a vehicle travels at a predetermined gear stage, a line pressure generated by a hydraulic pump driven by the internal combustion engine is transmitted to the oil passage L1 and the oil passage L3, and hydraulic pressure of the oil passage L1 is transmitted to the oil passage L2, the oil passage L4, and the oil passage L6 through the check valve 124. The line pressure is supplied to the oil passage L2 and the hydraulic pressure accumulates in the accumulation chamber 136a of the accumulator 136.

The normally closed type solenoid valve 122F is excited by energization and is opened, and the normally closed type solenoid valve 122D is also excited by energization and is opened. Then, when the solenoid valve 122F is opened, the spool of the parking inhibit valve 130 moves to the right side in FIG. 9, and a line pressure of the oil passage L3 is transmitted to the first unlocking oil chamber 114A through the parking inhibit valve 130. In addition, when the solenoid valve 122D is opened, a line pressure of the oil passage IA is transmitted to the second unlocking oil chamber 114B.

On the other hand, the normally closed type solenoid valve 122C is closed when power supply is stopped, and the normally open type solenoid valve 122E is excited by energization and closed. Then, when the solenoid valve 122C is closed, oil in the first locking oil chamber 112A is drained from the solenoid valve 122, and when the solenoid valve 122E is closed, the first ball valve 126A is closed and thus oil in the second locking oil chamber 112B is drained from the first ball valve 126A. As a result, the parking piston 54 moves to the left side in FIG. 9 and parking lock is released (parking released state).

While a flow rate of oil that can pass through the solenoid valve 122E is relatively low, a flow rate of oil that can pass through the first ball valve 126A that is opened or closed by the solenoid valve 122E is relatively high. Therefore, it is possible to improve operational responsiveness of the parking piston 54 by interposing the first ball valve 126A.

As described above, while the vehicle travels, the solenoid valve 122C and the solenoid valve 122E are closed and the solenoid valve 122F and the solenoid valve 122D are opened so that the parking piston 54 is operated at an unlock position and parking lock can be released (parking released state).

In addition, the parking lock mechanism 40 includes two locking oil chambers (the first locking oil chamber 112A and the second locking oil chamber 112B) at one end of the parking piston 54 and includes two unlocking oil chambers (the first unlocking oil chamber 114A and the second unlocking oil chamber 114B) at the other end thereof. Thereof, even if one of the solenoid valve 122F and the solenoid valve 122D is fixed in a closed state, and no hydraulic pressure is supplied to the first unlocking oil chamber 114A or the second unlocking oil chamber 114B, or even if one of the solenoid valve 122C and the solenoid valve 122E is fixed in an open state, and hydraulic pressure is supplied to the first locking oil chamber 112A or the second locking oil chamber 112B, it is possible to operate the parking piston 54 at an unlock position (notP position, a parking released state) without problem and ensure redundancy.

Here, the solenoid valve 122F is opened at a first predetermined gear stage and the solenoid valve 122D is opened at a second predetermined gear stage, and the first predetermined gear stage and the second predetermined gear stage partially overlap. Therefore, according to a gear stage set at this time, there are cases in which a line pressure is supplied to only the first unlocking oil chamber 114A, a line pressure is supplied to only the second unlocking oil chamber 114B, and a line pressure is supplied to both the first unlocking oil chamber 114A and the second unlocking oil chamber 114B. However, in all of the cases, since the parking piston 54 moves to the left side in FIG. 9 and parking lock is released, there is no problem. Then, in an overlapping gear stage, since a line pressure is supplied to both the first unlocking oil chamber 114A and the second unlocking oil chamber 114B, even if the solenoid valve 122F or the solenoid valve 122D fails and supply of a line pressure is stopped, parking lock remains in a deactivated state (parking released state) and redundancy is enhanced.

When the shift operation unit such as a shift lever is operated in a P range and a vehicle is stopped while the internal combustion engine operates, the solenoid valve 122C and the solenoid valve 122E are opened, and the solenoid valve 122F and the solenoid valve 122D are closed. When the solenoid valve 122C is opened, a line pressure of the oil passage L1 is transmitted to the first locking oil chamber 112A, and when the solenoid valve 122E is opened, the first ball valve 126A is opened and a line pressure of the oil passage L2 is transmitted to the second locking oil chamber 112B.

On the other hand, when the solenoid valve 122F is closed, hydraulic fluid in the first unlocking oil chamber 114A is discharged from the parking inhibit valve 130, and when the solenoid valve 122D is closed, hydraulic fluid in the second unlocking oil chamber 114B is discharged from the solenoid valve 122D. As a result, the parking piston 54 moves to the right side in FIG. 9 and parking lock operates (parking locked state).

As described above, when the driver selects the P range using the shift operation unit while the internal combustion engine operates, the solenoid valve 122C and the solenoid valve 122E are opened, and the solenoid valve 122F and the solenoid valve 122D are closed. Therefore, the parking piston 54 can be operated at a parking lock position. In this case, since the parking lock mechanism 40 includes two locking oil chambers (the first locking oil chamber 112A and the second locking oil chamber 112B) and two unlocking oil chambers (the first unlocking oil chamber 114A and the second unlocking oil chamber 114B, even if one of the solenoid valve 122F and the solenoid valve 122D is fixed in an open state, and hydraulic pressure is supplied to the first unlocking oil chamber 114A or the second unlocking oil chamber 114B, or one of the solenoid valve 122C and the solenoid valve 122E is fixed in a closed state and no hydraulic pressure is supplied to the first locking oil chamber 112A or the second locking oil chamber 112B, it is possible to operate the parking piston 54 at a parking lock position (P position) without problem and ensure redundancy (parking locked state).

When the shift operation unit is operated in the P range and ignition (vehicle power source) is turned off, the internal combustion engine is stopped and thus a line pressure due to the pump driven by the internal combustion engine is removed. However, according to the present embodiment, the parking lock mechanism 40 is operated due to hydraulic pressure accumulated in the accumulator 136 without problem, and can be put into a parking locked state.

Then, when the solenoid valve 122E is opened, hydraulic pressure of the accumulator 136 is transmitted to the second locking oil chamber 112B. On the other hand, when the solenoid valve 122F is closed, hydraulic fluid in the first unlocking oil chamber 114A is discharged from the parking inhibit valve 130, and when the solenoid valve 122D is closed, hydraulic fluid in the second unlocking oil chamber 114B is discharged from the solenoid valve 122D. As a result, the parking piston 54 moves to the right side in FIG. 9 and parking lock operates (parking locked state).

As described above, even if the P range is selected using the shift operation unit to turn ignition off and thus a line pressure is removed, the parking lock mechanism 40 can be operated due to hydraulic pressure accumulated in the accumulator 136 without problem (parking locked state).

In addition, the vehicle of the present embodiment can perform idling stop control, and the internal combustion engine stops during temporary stop such as during signal waiting, the pump also stops and a line pressure is removed.

Even if the internal combustion engine starts as return from idling stop control, since a line pressure does not immediately rise, it is not possible to supply hydraulic pressure to the first brake B1 which is a hydraulic engagement device necessary for starting, and prompt starting may be inhibited. However, according to the present embodiment, it is possible to operate the first brake B1 without delay at hydraulic pressure of the accumulator 136 remained in idling stop control.

More specifically, hydraulic pressure accumulated in the accumulator 136 is supplied from the oil passage L2 to the oil passage L6 at the same time as return from idling stop control. In this case, since the solenoid valve 122D interposed in the oil passage L4 is opened when power supply is stopped, a spool of the brake cut valve 128 moves to the left side in FIG. 9. Therefore, when the linear solenoid valve 140G interposed in the oil passage L6 is opened to a predetermined degree of opening, hydraulic pressure accumulated in the accumulator 136 can be supplied to the first brake B1 and the vehicle can be started promptly.

While the operations of the first brake B1 as return from idling stop control have been described above, the brake cut valve 128 can be operated by the solenoid valve 122D to control the first brake B1 even while the vehicle travels normally. When the spool of the brake cut valve 128 moves to the left side in FIG. 9, communication between the linear solenoid valve 140G and the first brake B1 is blocked and the solenoid valve 122D is closed, and supply of hydraulic pressure to the second unlocking oil chamber 114B is blocked. However, since it remains at an unlock position due to hydraulic pressure supplied to the first unlocking oil chamber 114A, there is no risk of parking lock being operated (parking released state).

In addition, according to the present embodiment, the solenoid valve 122C is also used for operating the lock-up clutch 2a of the torque converter 2. That is, while the vehicle travels, since the solenoid valve 122C is closed, a spool of the lock-up clutch shift valve 138 moves to the right side in FIG. 9, and a lock-up clutch pressure is supplied to the lock-up clutch 2a of the torque converter 2. When the solenoid valve 122C is opened in this state, the spool of the lock-up clutch shift valve 138 moves to the right side in FIG. 9 and hydraulic pressure of the lock-up clutch 2a is discharged. Therefore, the lock-up clutch 2a can be disengaged.

When the solenoid valve 122C is opened, a line pressure is supplied to the first locking oil chamber 112A. However, in this case, since a line pressure is supplied to both the first unlocking oil chamber 114A and the second unlocking oil chamber 114B, even if a line pressure is supplied to the first locking oil chamber 112A, the parking piston 54 does not move to a parking lock position, and there is no risk of parking lock being operated.

As described above, according to the parking lock mechanism 40 of the present embodiment, since the solenoid valve 122C and the solenoid valve 122D that control operations of the parking piston 54 are also used for control of the lock-up clutch 2a of the torque converter 2 and control of the first brake B1, it is possible to reduce the number of solenoid valves and it is possible to simply the structure of the hydraulic pressure control device 100. In addition, since the accumulator 136 is used not only for operation of parking lock but also for operation of the first brake B1 which is a hydraulic engagement device as return from idling stop control, it is possible to reduce the number of accumulators and it is possible to further simplify the structure of the hydraulic pressure control device 100.

Functions of the hydraulic pressure control device 100 as a control unit are also performed by the transmission control device ECU. The transmission control device ECU can receive current shift position information and shift switching request information based on an operation performed by the driver using an operation unit.

In addition, the transmission control device ECU receives a parking input request instruction signal. Here, it is determined whether a parking input is necessary based on predetermined vehicle information such as a travel speed of a vehicle that the control unit itself has received and a parking input instruction signal (or a parking input instruction flag) may be issued.

In addition, in the transmission control device ECU, a countdown timer is provided, a numerical value is reduced from a preset initial value as the time passes.

In addition, the transmission control device ECU can receive a signal of a stroke sensor 56 provided at the parking piston 54 and determine whether the parking piston 54 is positioned on a parking lock side or release side.

Figure 10:
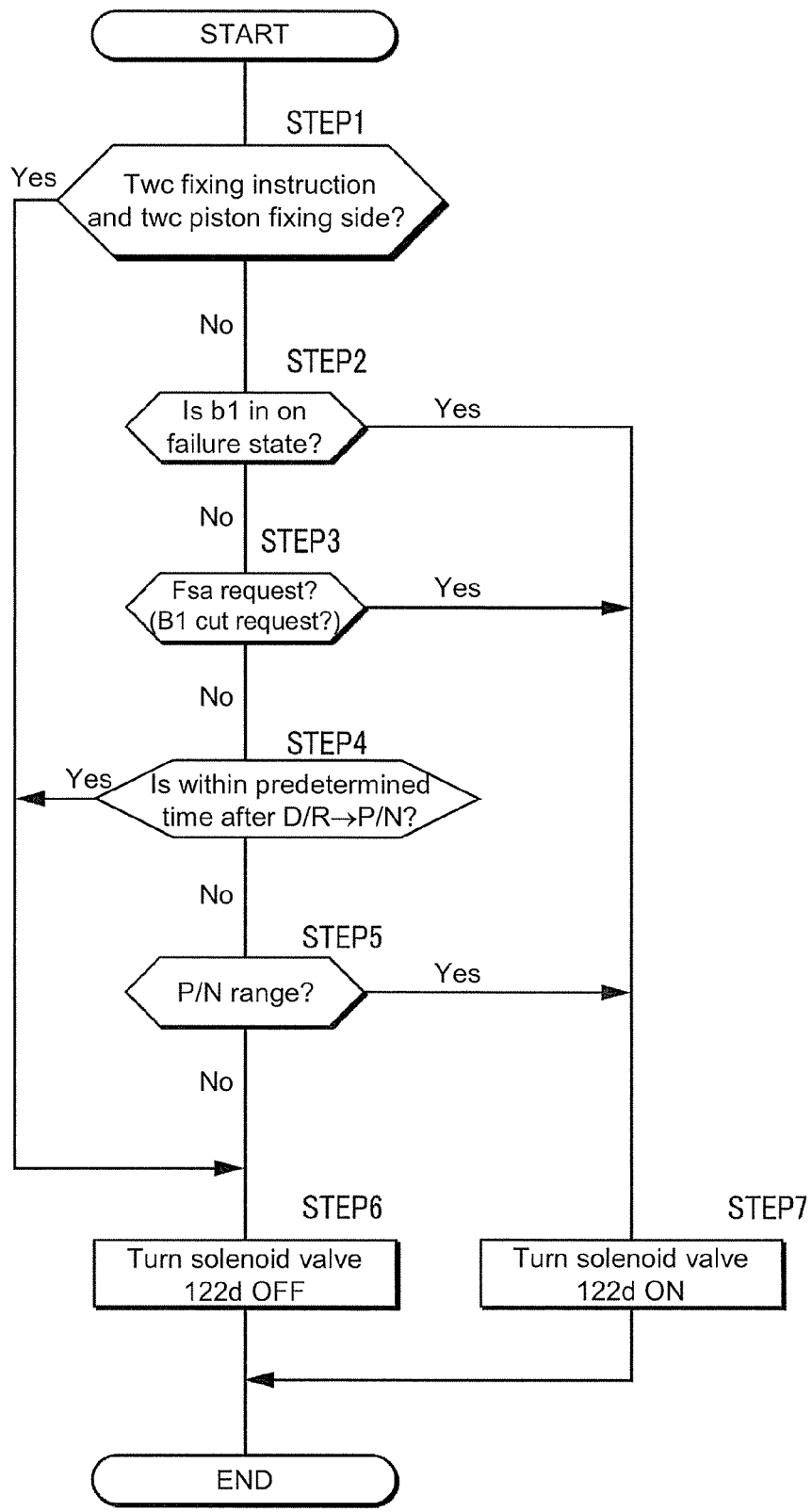
FIG. 10 is a flowchart showing operations of a control unit of the hydraulic pressure control device of the present embodiment.

Next, with reference to FIG. 10, first, the transmission control device ECU checks whether a TWC lock-side instruction is received and a piston of a TWC is located at a position other than a lock side in STEP1. When no TWC lock-side instruction is received and/or a piston of a TWC is not located at a position other than a lock side, the process advances to STEP2, and it is checked whether the first brake B1 is in an on failure state (failure in which the state is unintentionally switched to an engaged state). Determination of whether the first brake B1 is in an on failure state is based on whether a detection signal of a hydraulic detection device (not shown) provided in the hydraulic pressure control device 100 is transmitted to the transmission control device ECU and thus hydraulic pressure is supplied to the first brake B1.

When the first brake B1 is not in an on failure, the process advances to STEP3, and it is checked whether a first brake fastening prevention request for preventing fastening (engaged state) of the first brake is issued B1 according to a fail-safe assistance request. For example, when internal spools are stacked while the linear solenoid valve 140G outputs hydraulic pressure, the first brake fastening prevention request is used to request prevention of the first brake B1 from being fastened and supply of hydraulic pressure from the solenoid valve 122D to the brake cut valve 128. Accordingly, in this example, regardless of blocking supply of power to the linear solenoid valve 140G, when hydraulic pressure is output from the linear solenoid valve 140G by the hydraulic detection device, the transmission control device ECU that has received the information issues a first brake fastening prevention request.

When no first brake fastening prevention request is issued, the process advances to STEP4, and it is checked whether an elapsed time is within a predetermined time after the range is shifted and changed from a traveling range (for example, a D range or R range) to a non-traveling range (for example, a P range or N range). Determination of whether an elapsed time is within a predetermined time is based on whether a countdown timer of the transmission control device ECU reaches "0." This is because the range is highly likely to be switched from a traveling range to a non-traveling range before the predetermined time has elapsed, it is not preferable to stop supply of power to the solenoid valve 122D.

When an elapsed time is not within a predetermined time (when the countdown timer reaches "0" and a predetermined time has elapsed), the process advances to STEP5, and it is checked whether the range is a P range or N range. When the range is not a P range or N range (for example, when the range is a D range or N range), the process advances to STEP6, supply of power to the solenoid valve 122D is blocked, and the flow process in FIG. 10 at this time ends. In the present embodiment, the flow process in FIG. 10 is repeatedly performed at a predetermined control period (for example, 10 milliseconds).

In STEP1, when a TWC lock-side instruction is received and the two-way piston 212 of the two-way clutch F1 is located at a position (for example, a position on a reverse rotation prevention state side) other than a fixed state side, the process advances to STEP6, supply of power to the solenoid valve 122D is blocked, and the flow process in FIG. 10 at this time ends.

In STEP2, when the first brake B1 is in an on failure state, the process branches to STEP7, power is supplied to the solenoid valve 122D, and the flow process in FIG. 10 at this time ends.

In STEP3, when the first brake fastening prevention request for preventing fastening of the first brake B1 is issued according to a fail-safe assistance request, the process branches to STEP7, power is supplied to the solenoid valve 122D, and the flow process in FIG. 10 at this time ends.

In STEP4, when an elapsed time is within a specified time after the range is shifted and changed from a traveling range (for example, a D range or R range) to a non-traveling range (for example, a P range or N range), the process advances to STEP6, supply of power to the solenoid valve 122D is blocked, and the flow process in FIG. 10 at this time ends.

In STEP5, when the range is a P range or N range, the process branches to STEP7, power is supplied to the solenoid valve 122D, and the flow process in FIG. 10 at this time ends.

As described above, from the time at which switching to a fixed state side of the two-way clutch F1 (from when a fixed state side (LOCK side) is instructed as an instruction signal of the solenoid valve 122D until an actual position of the two-way piston 212 is completely moved to a fixed state side (LOCK side)), a switching instruction of the solenoid valve 122D assigns the highest priority to a control request of the two-way clutch F1 and blocks supply of power to the solenoid valve 122D.

In parking lock control, an instruction of the solenoid valve 122D preferentially turns the solenoid valve 122D off for a time until P release is performed when P-N shifting is performed as fail-safe assistance when the solenoid valves 122C to 122F related to switching of the parking piston 54 have failed.

In fastening prevention control of the first brake B1, in order to prevent a driving force of an engine from being transmitted to foot shafts (drive wheel) in a P range or N range and a vehicle from traveling when the first brake B1 is in an on failure state (the linear solenoid valve 140G on stack or an like), in the P range or N range, the solenoid valve 122D is energized and supply of hydraulic pressure to the first brake B1 is blocked. Accordingly, since supply of hydraulic pressure to the first brake B1 is blocked in the N range, hydraulic pressure is likely to be lowered due to oil leakage from gaps of a valve and the like and it is possible to generate a required hydraulic pressure even at a high oil temperature and slow rotation. Here, the high oil temperature corresponds to a first predetermined temperature or higher of the disclosure.

In addition, it is possible to prevent creep traveling by slightly connecting power of an engine even in the N range due to drag of oil by the clutch at an extremely low oil temperature (a temperature that is equal to or lower than a second predetermined temperature) at which viscosity of oil is high.

When there is a fastening prevention request of the first brake B1 for fail-safe assistance when other failures are detected, the request is preferentially controlled. For example, when the first clutch C1 is in an on failure state, supply of hydraulic pressure to the first clutch C1 is prevented for travel in the D range, and power is supplied to the solenoid valve 122D according to a failure detection request when required for driving at the $2.5^{th}$ gear (travel at the 2.5 gear stage that is a gear ratio between the second gear and the third gear).

However, in the fastening prevention control of the first brake B1, when the first brake B1 is in an on failure state, fastening of the first brake B1 is prevented always so that engagement of the first brake B is avoided.

However, also in the fastening prevention control of the first brake B1, in the P range or N range after the range is shifted from the D range or R range to the P range or N range, due to off gear shock with a range pressure at a shift position before switching, the fastening prevention control of the first brake B1 is not performed for a predetermined time. When the fastening prevention control of the first brake B1 is performed, since initial pressures of the first brake B1, the second brake B2, and the first clutch C1 are not supplied, such clutches and brakes suddenly disengaged and shock may occur. Thus, when initial pressures of the first brake B1, the second brake B2, and the first clutch C1 are smoothly reduced, shock is avoided.

However, also in the fastening prevention control of the first brake B1, when the on failure of the first brake B1 does not occur, it is not necessary to block supply of hydraulic pressure to the first brake B in a situation (for example, the N range in a high vehicle stopped state) in which lubrication is necessary in the N range.

In addition, when a line pressure adjustment valve (linear solenoid valve; not shown) configured to adjust a line pressure has failed and a line pressure is lowered (during a low line pressure failure), power is supplied to the solenoid valve 122D and hydraulic pressure of the line pressure adjustment valve is prevented from being supplied to a regulator valve for line pressure adjustment. Accordingly, the regulator valve performs switching so that a line pressure is constantly adjusted to a high level, and the line pressure becomes higher (line pressure boost for fail-safe assistance).

According to the hydraulic pressure control device of the present embodiment, by appropriately controlling a plurality of functions, one solenoid valve 122D can have the above-described plurality of functions having different requests ((1) a thrust force on a reverse rotation prevention state (OWC) side of the two-way clutch F1, (2) a thrust force on a parking released state (notP) side of the parking lock mechanism 40, (3) prevention of abnormal traveling according to a failure of switching to an unintended engaged state of the first brake B1, (4) ensure a line pressure at a high oil temperature, (5) prevention of a creep phenomenon in the N range at a low oil temperature, and (6) boost a line pressure for fail-safe assistance). Compared to a case in which a dedicated solenoid valve is provided for each function, it is possible to reduce the size and weight of the hydraulic pressure control device and reduce the manufacturing cost.

Here, while the solenoid valve 122D having six functions (the above functions (1) to (6)) has been described in the present embodiment, a control valve of the disclosure may have at least two functions of the (1) to (6) functions. In this case also, it is possible to obtain operations and effects of the disclosure that it is possible to reduce the size and weight of the hydraulic pressure control device.

For example, the control valve may switch only between (1) a thrust force on a reverse rotation prevention side of the two-way clutch F1 and (2) a thrust force on a parking released state side of the parking lock mechanism 40, and similarly, may switch between any combination of (1) and (3), (1) and (4), (1) and (5), (1) and (6), (2) and (3), (2) and (4), (2) and (5), (2) and (6), (3) and (4), (3) and (5), (3) and (6), (4) and (5), (4) and (6), and (5) and (6) among the above six functions.

In addition, while a normally closed type valve has been described as the solenoid valve 122D in the embodiment, the normally open type solenoid valve 122D may be used as the control valve of the disclosure. In this case, the hydraulic pressure control device 100 may be configured such that, when the solenoid valve 122D is energized, supply of hydraulic pressure from the solenoid valve 122D to the brake cut valve 128 is stopped, and when supply of power to the solenoid valve 122D is stopped, hydraulic pressure is supplied from the solenoid valve 122D to the brake cut valve 128.

What is claimed is:

1. A fluid pressure control device comprising a plurality of control valves and a control unit configured to control the control valves,
wherein any one of the plurality of control valves has at least two functions among the following (1) to (3) functions:
(1) a function of switching a state of a two-way clutch, the two-way clutch being switchable between a reverse rotation prevention state in which forward rotation of a rotor is allowed and reverse rotation is prevented and a fixed state in which the rotor is fixed;
(2) a function of switching a state of a parking lock mechanism; and
(3) a function of switching a supply of hydraulic pressure to a predetermined clutch that is put into an engaged state when a gear stage selected when driving of a vehicle starts is set;
the fluid pressure control device controlling hydraulic pressure of a transmission and comprising
a two-way clutch piston that is configured to switch a state of the two-way clutch,
wherein the transmission includes a rotor and a detection unit configured to detect a state of the two-way clutch, and
when an instruction to put the two-way clutch into the fixed state is issued and the detection unit confirms that the two-way clutch is not in the fixed state, the control unit causes the control valve to supply fluid pressure at which the two-way clutch is put into the fixed state
wherein the control valve switches supply of fluid pressure to the predetermined clutch,
when an instruction to put the two-way clutch into the fixed state has not been issued or when the detection unit confirms that the two-way clutch is in the fixed state, the control unit checks whether blocking of the supply of fluid pressure to the predetermined clutch has been requested, and when blocking of the supply of fluid pressure to the predetermined clutch has been requested, the control unit causes the control valve to block supply of fluid pressure to the predetermined clutch.

2. The fluid pressure control device according to claim 1, wherein, when the range is switched from a traveling range to a non-traveling range, the control valve blocks supply of fluid pressure to a fluid pressure supply target for a predetermined time.

3. The fluid pressure control device according to claim 2, wherein, in the non-traveling range, fluid pressure is supplied to the fluid pressure supply target.

* * * * *